United States Patent [19]

Hopkins

[11] Patent Number: 5,708,504
[45] Date of Patent: Jan. 13, 1998

[54] INTERFERING IMAGING SPECTROMETER

[75] Inventor: Mark F. Hopkins, Fort Walton Beach, Fla.

[73] Assignee: The United States of America as represented by the Secretary of the Air Force, Washington, D.C.

[21] Appl. No.: 736,690

[22] Filed: Oct. 25, 1996

[51] Int. Cl.$^6$ .................................................. G01B 9/02
[52] U.S. Cl. .................................. 356/346; 356/352
[58] Field of Search ........................... 356/345, 346, 356/352

[56] References Cited

U.S. PATENT DOCUMENTS

| | | | |
|---|---|---|---|
| 5,116,133 | 5/1992 | Sweeney | 356/352 |
| 5,177,556 | 1/1993 | Rioux | 356/73 |
| 5,251,007 | 10/1993 | Rinke | 356/319 |
| 5,260,767 | 11/1993 | Cook | 356/326 |
| 5,276,321 | 1/1994 | Chang et al. | 250/226 |
| 5,287,214 | 2/1994 | Robertson et al. | 356/352 |
| 5,297,555 | 3/1994 | Martens | 128/665 |
| 5,357,340 | 10/1994 | Zochbauer | 356/352 |
| 5,369,481 | 11/1994 | Berg et al. | 356/319 |
| 5,371,358 | 12/1994 | Chang et al. | 250/226 |
| 5,377,003 | 12/1994 | Lewis et al. | 356/300 |

*Primary Examiner*—Frank G. Font
*Assistant Examiner*—Robert Kim
*Attorney, Agent, or Firm*—Bobby D. Scearce; Thomas L. Kundert

[57] ABSTRACT

An interfering imaging spectrometer is described wherein a single interference filter disposed in preselected angular relationship with one or more mirrors separates an incoming optical signal or field of view into multiple contiguous images separated spatially and spectrally, each image having a unique spectral content.

2 Claims, 3 Drawing Sheets

INTERFERING IMAGING SPECTROMETER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to imaging spectrometer systems and methods, and more particularly to an imaging spectrometer system having no moving parts and rapid response time.

In the operation of existing commercially available imaging spectrometers, spectral scanning is generally performed using a prism, diffraction grating or filter which is moved into and out of the optical path of an incident optical signal. The time required to scan the spectral energy of the optical signal onto an optical detector, such as a charge-coupled-device, can be at least several milliseconds and is therefore undesirably long. Because certain spectral analysis applications, such as the temperature analysis of projectiles, require fast (of the order of a microsecond) response time, prior art spectrometer systems and methods are inadequate.

The invention solves or substantially reduces in critical importance problems with prior art spectrometer systems and methods by providing an improved imaging spectrometer including a single interference filter for spectral analysis of the incoming signal and takes advantage of the spectral transmission and reflection variations with incident angle of the incoming signal within the interference filter. The invention exhibits a rapid response time in the microsecond range, and multiple images can be formed from a single incoming signal so that a single snapshot will acquire all spectral information of the signal. The spectrometer of the invention has no moving parts and can therefore have a rugged simple structure which is easily and accurately calibrated.

It is therefore a principal object of the invention to provide an improved spectrometer system and method.

It is a further object of the invention to provide an interfering imaging spectrometer system and method.

It is yet another object of the invention to provide an imaging spectrometer having very fast response time.

It is another object of the invention to provide an interfering imaging spectrometer having no moving parts.

It is yet another object of the invention to provide an interfering imaging spectrometer which is rugged in construction and which can be easily and accurately calibrated.

It is another object of the invention to provide an interfering imaging spectrometer having a single spectral filter.

These and other objects of the invention will become apparent as a detailed description of representative embodiments thereof proceeds.

SUMMARY OF THE INVENTION

In accordance with the foregoing principles and objects of the invention, an interfering imaging spectrometer is described wherein a single interference filter disposed in preselected angular relationship with one or more mirrors separates an incoming optical signal or field of view into multiple contiguous images separated spatially and spectrally, each image having a unique spectral content.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
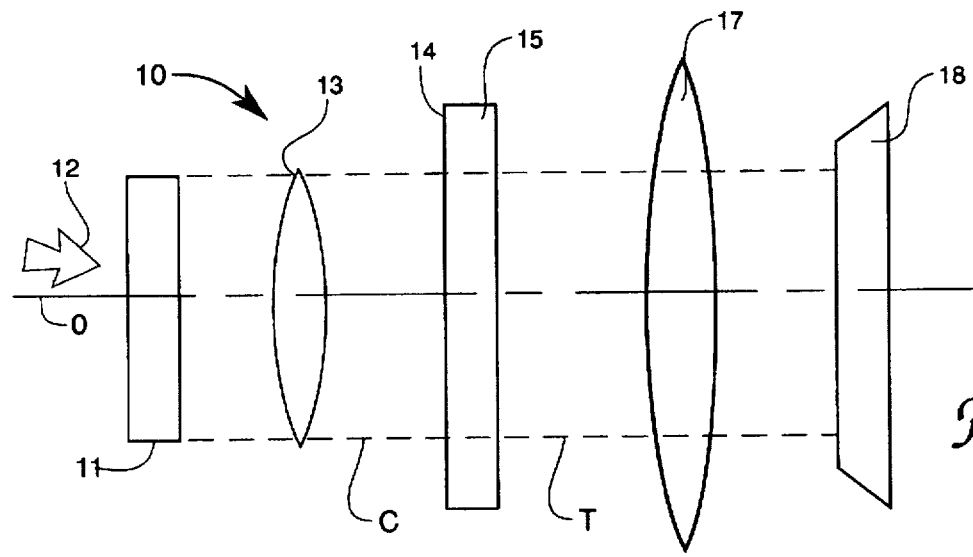
FIG. 1 is a schematic block diagram illustrating the essential components of a spectrometer system according to the invention.

Referring now to the drawings, FIG 1 illustrates in schematic block diagram form the essential components of a representative spectrometer system 10 according to the invention. In system 10, any suitable optical train 11 (mirrors, etc) may be disposed for directing an incoming optical signal 12 along optical axis O onto collimating lens 13. Collimated beam C is then directed onto interference filter 15 having transmittance in a preselected passband. Filter 15 have any desired passband in any selected spectral region, ultraviolet to infrared, depending on the intended use of the invention, the particular selected passband not considered limiting of the invention. For example, in selecting a passband for an incoming signal in the range of about 3 microns ($\mu m$) to 5 $\mu m$, it may be appropriate to select a filter having four filter bands, viz., 3–3.4 $\mu m$, 3.5–3.9 $\mu m$, 4.04–4.5 $\mu m$ and 4.6–5.0 $\mu m$. Spectral energy within the transmission passband of filter 15 is transmitted as transmitted beam T onto imaging lens 17 and imaged onto optical detector 18 as suggested in the schematic of FIG 1. Optical energy within beam C which is not within the passband of filter 15 is substantially totally reflected from filter 15 at incident surface 14 thereof.

Any suitable optical detector 18 sensitive to the selected passband of filter 15 may be used, within scope of the invention, as would occur to the skilled artisan practicing the invention and guided by these teachings, such as a charge-couple device, photodiode array or infrared array, detector selection therefore not being considered limiting of the invention.

Figure 1A:
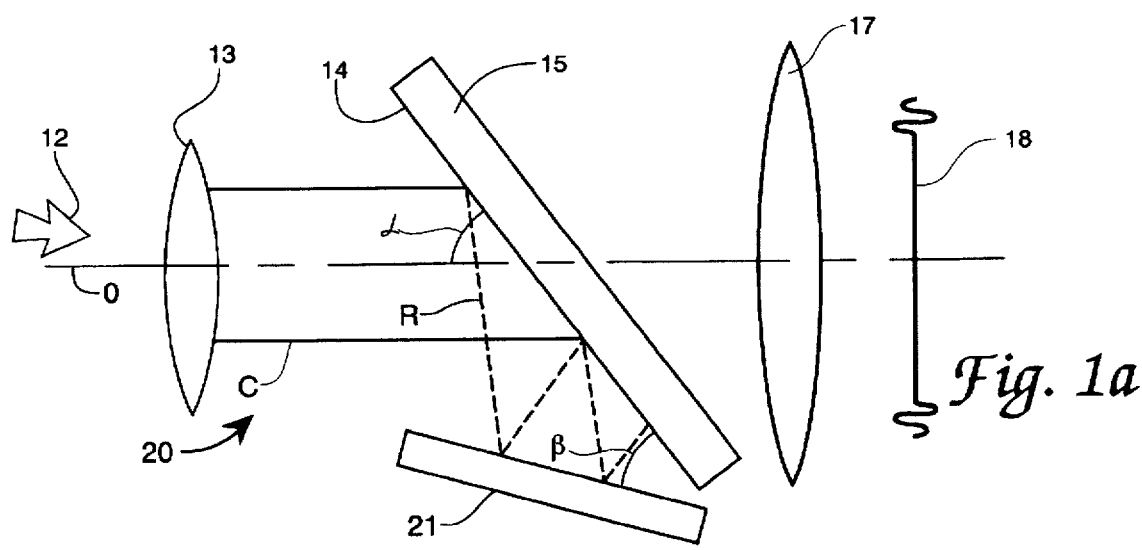
FIG 1a is a schematic block diagram of another embodiment of the invention.

Referring now to FIG. 1a, shown therein is a schematic block diagram of another embodiment of the invention in the form of representative system 20, wherein incoming signal 12 is formed into multiple images separated spatially and spectrally. In accordance with a principle of operation for the FIG. 1a embodiment, filter 15 is disposed at preselected angle $\alpha$ because the transmission characteristics of interference filter 15 having a specific passband is a function of the angle of incidence of the incident optical energy. Selection of the angle $\alpha$ of filter 15 with respect to axis O may be made by the skilled artisan practicing the invention and will the material used and the selected band pass for each of the subsequent filters. Accordingly, one or more mirrors 21 may be disposed between collimating lens 13 and filter 15 at respective separation angles β and at different planes corresponding to different azimuthal angles of incidence of signal 12 relative to optical axis O (the separation angle β of one such mirror 21 is illustrated in FIG. 1a) to reflect the beam R reflected from surface 14 onto filter 15 at an angle of incidence different from the angle of incidence of collimated beam C. The transmission character of filter 15 is dependent on the cosine of the angle of incidence of the incident beam, and filter 15 therefore transmits differently for the reflected beam R as redirected by mirror 21 than for collimated beam C. The selected angle β between mirror 21 and filter 15 will correspond to a particular field angle for incoming signal 12, and to its unique cosine dependent filter value (passband). Multiple (depending on the number of mirrors 21 included in system 20) contiguous images are therefore formed at detector 18 from a single field of view or incident signal 12, and each such image has its own unique spectral content.

Figure 2:
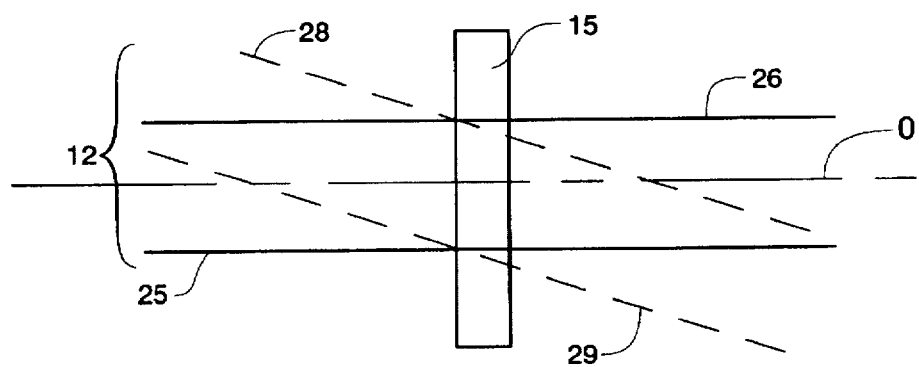
FIG. 2 is a schematic illustration of the interaction of incoming optical signals with the interference filter of the FIG. 1 system.
Figure 3:
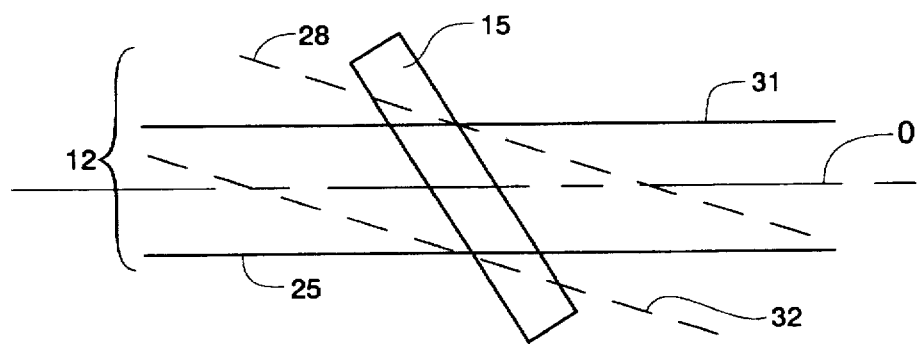
FIG. 3 is a schematic illustration of the interaction of incoming optical signals with the interference filter of FIG. 2 tilted with respect to the optical axis of the FIG. 1 system.
Figure 4:
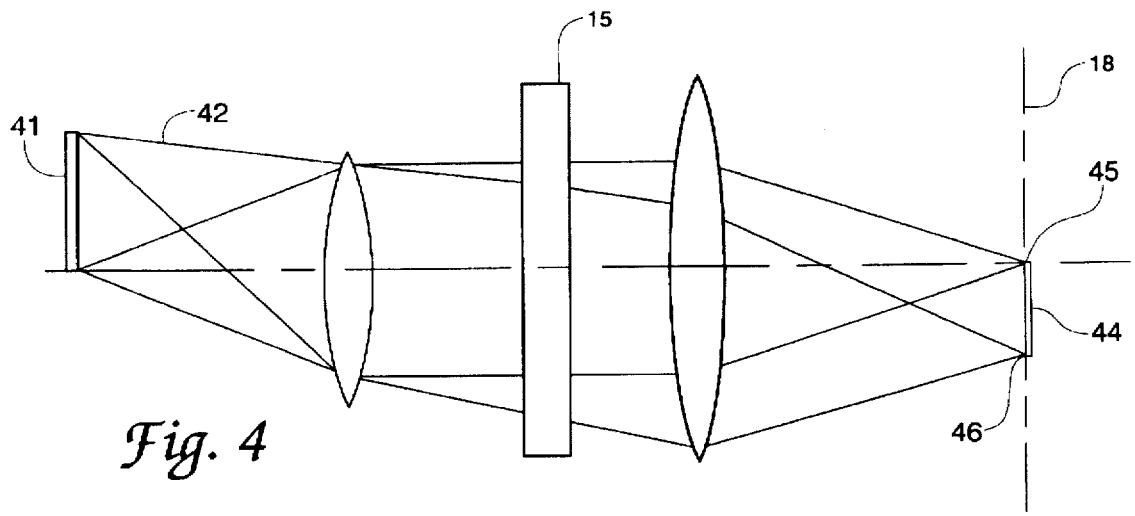
FIG. 4 is a schematic illustration of the interaction of an off-axis incoming optical signal with the interference filter of the FIG. 1 system.

FIG. 2 shows a simplified schematic illustration of the interaction of incoming optical signal 12 with filter 15 in system 10 of FIG. 1. Consider a filter 15 having a bandpass in the red end of the optical spectrum. For an optical signal 12 comprising substantially white light, that portion 25 of signal 12 corresponding to a field angle along optical axis O would result in a transmitted beam 26 in the red corresponding to the filter 15 passband. For any portion 28 of signal 12 corresponding to a field of view at successively greater incidence angles on filter 15, the corresponding transmitted beam 29 would be shifter to a shorter (green) wavelength as a function of the cosine of the angle of incidence. For example, filter 15 has a bandpass at normal incidence of one micron, then for a portion 28 in the field of view incident at 60°, the bandpass would be about one-half micron and somewhat more narrow than the passband at normal incidence. Referring now to FIG. 3, it is noted that if filter 15 is inclined with respect to optical axis O, as, for example, shown in FIG 1a, portion 25 of signal 12 incident along axis O has a corresponding transmitted beam 31 shifted to the green, and portion 28 has a corresponding transmitted beam 32 shifted further into the blue. Accordingly, and with reference now to FIG. 4, wherein filter 15 is disposed for normal incidence of signal 42 along optical axis O, object 41 comprising a white source would result in an image 44 on detector 18 having an end 45 nearest axis O shifted in spectral content to the yellow and an end 46 furthest from axis O shifted in spectral content further into the blue.

Figure 5:
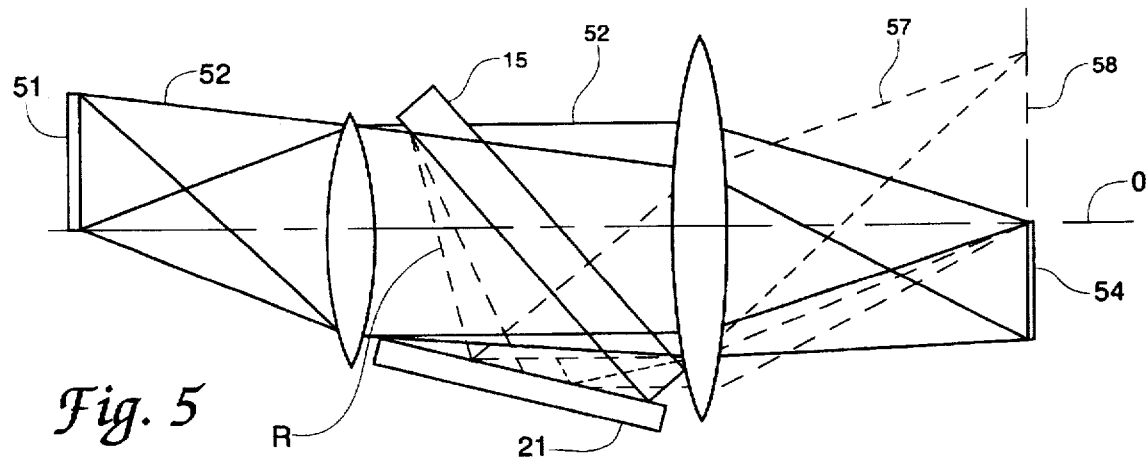
FIG. 5 is a schematic illustration of the interaction of an off-axis incoming optical signal with the interference filter tilted with respect to the optical axis of the FIG 1 system and with the addition of a mirror for providing multiple images of the incoming signal.

Referring now to FIG. 5, shown therein is a schematic illustration of the interaction of a white signal 52 from object 51 with inclined (with respect to axis O) filter 15 and mirror 21 as in the FIG 1a system. That portion of signal 52 which passes through filter 15 without reflection is indicated by solid lines and results in a first image 54 having, similarly to the illustration of FIG. 4, spectral content shifted toward the yellow nearest axis O and further into the blue furthest from axis O. In addition, reflected portion R (shown by broken lines) of signal 52 is redirected toward filter 15 by reflection off mirror 21, where the total deviation is now twice the separation angle between filter 15 and mirror 21, which results in a second transmitted beam 57 (also shown by broken lines) and a second image 58 shifted in spectral content further into the red with distance from axis O. Each additional mirror 21 (not shown) may be disposed at a respective preselected angles with respect to filter 15 to provide an additional image contiguous with images derived from reflections from the other mirrors, each such image containing its unique spectral content. Contiguous images will result where the separation angle between filter 15 and a respective mirror 21 is one-half the maximum field angle subtended by the object.

The invention therefore provides an interfering imaging spectrometer wherein a single interference filter and detector separates an image into its spectral components, and a single set of optics collects all optical energy needed to form the desired images. The invention has no moving parts, is simple and accurate in its calibration, and is highly light efficient, which is important for high speed applications. It is understood that modifications to the invention may be made as might occur to one with skill in the field of the invention within the scope of the teachings herein and of the appended claims. All embodiments contemplated hereunder which achieve the objects of the invention have therefore not been shown in complete detail. Other embodiments may be developed without departing from the spirit of the invention or from the scope of the appended claims.

I claim:

1. An interfering imaging spectrometer system, comprising:

(a) optical means for directing an optical signal along a preselected optical axis;

(b) a collimating lens disposed along said optical axis for collimating said optical signal and directing a collimated optical signal along said optical axis;

(c) an interference filter disposed along said optical axis for selectively filtering said collimated optical signal, said interference filter having transmittance in a preselected passband and disposed at a preselected angle to said optical axis for transmitting a first transmitted signal along said optical axis and reflecting a reflected signal at an angle corresponding to said preselected angle of said interference filter;

(d) a mirror disposed near said interference filter in preselected angular relationship to said interference filter and said optical axis for directing said reflected signal onto said interference filter and providing a second transmitted signal along said optical axis and a second reflected signal from said interference filter, said second transmitted signal having spectral content dependent on the angular relationship between said interference filter and said mirror and defining an image separated spatially and spectrally from the image defined by said first transmitted signal; and (e) an imaging lens and an optical detector disposed along said optical axis, said imaging lens disposed for imaging the transmitted signals onto said optical detector.

2. The spectrometer system of claim 1 wherein said optical detector is a charge-couple device, photodiode array or infrared array.

* * * * *